Figure 8:
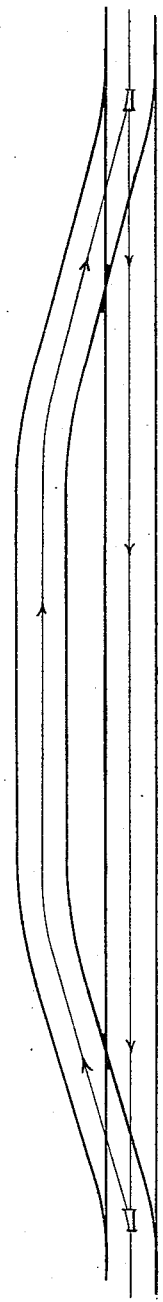

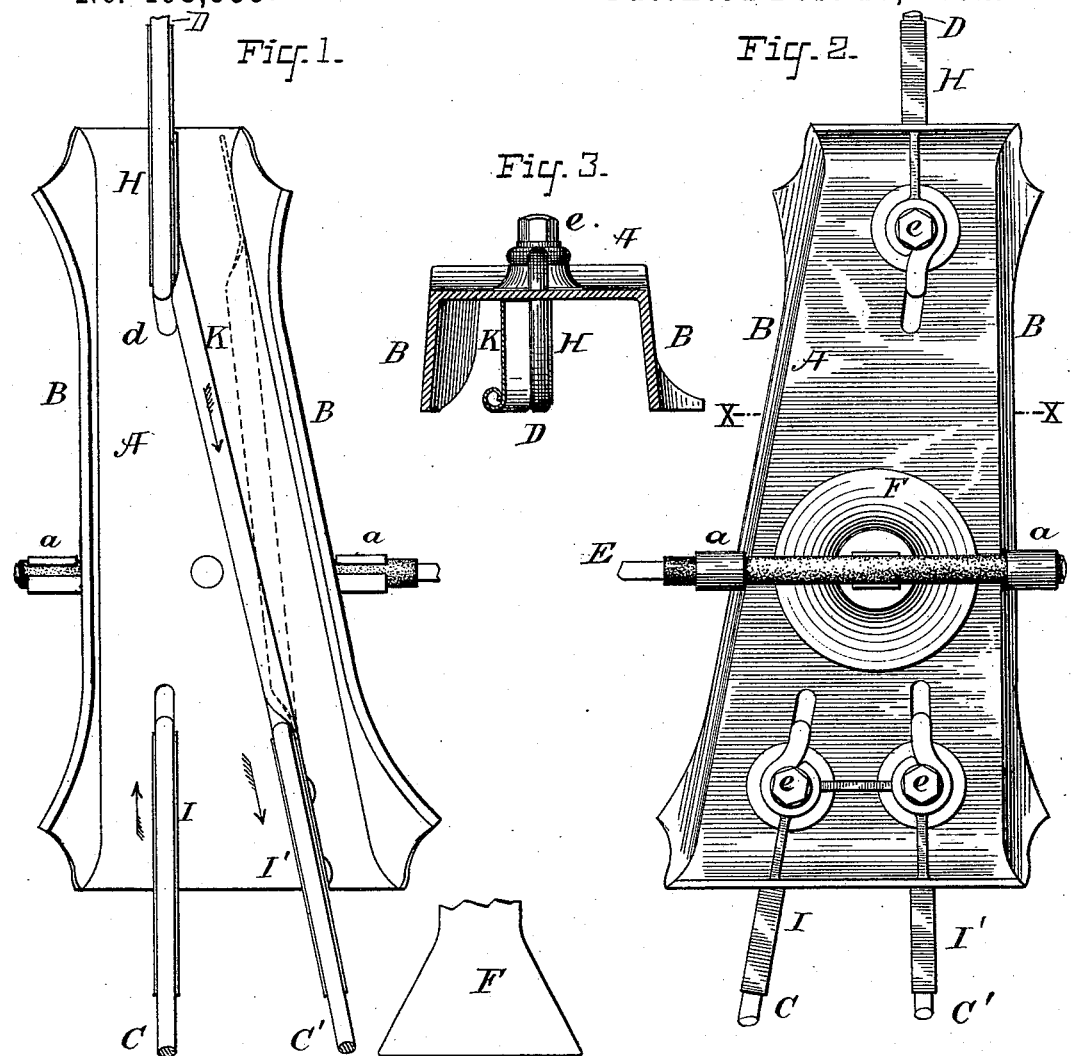

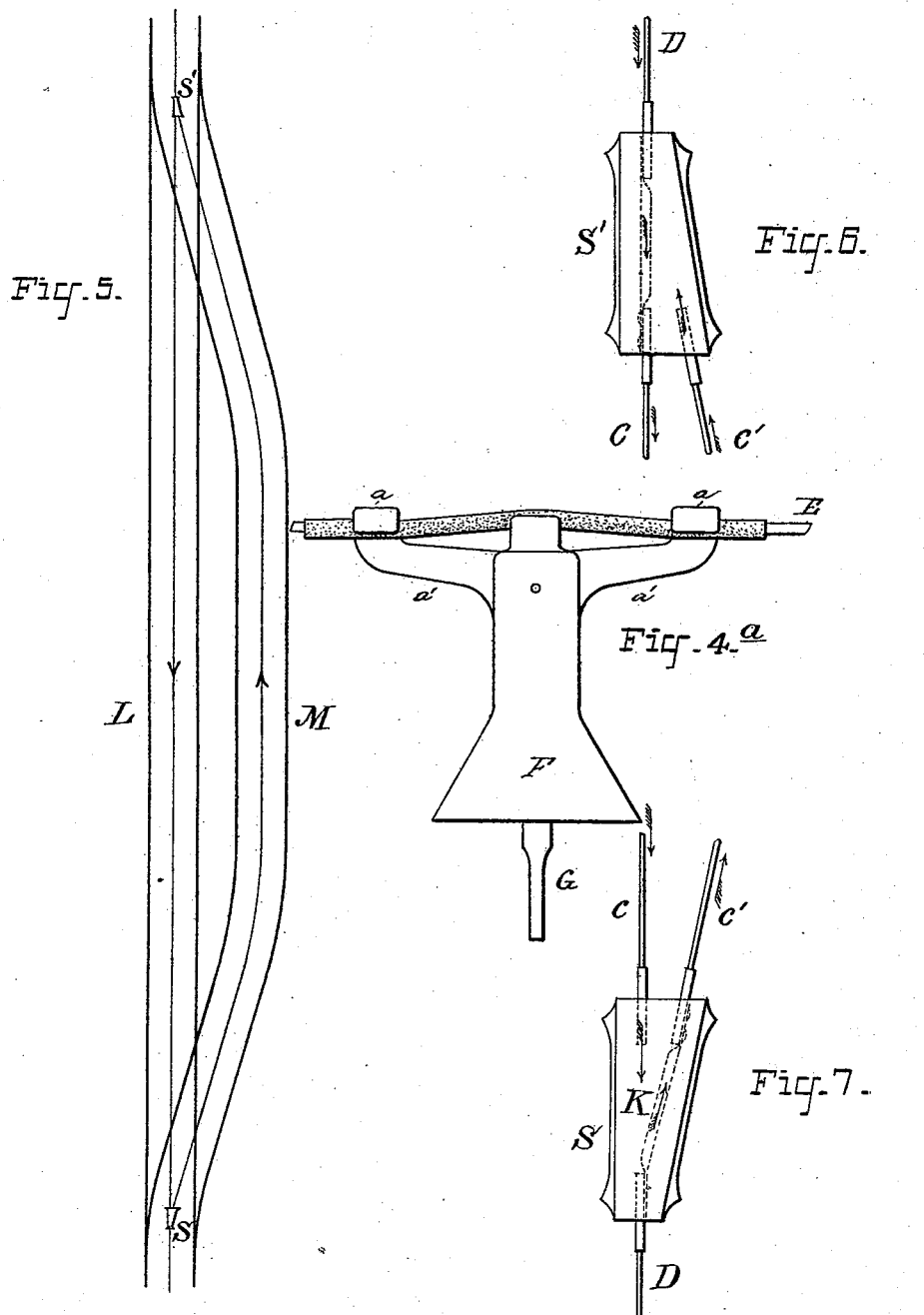

(No Model.) 5 Sheets—Sheet 3.
F. J. SPRAGUE & P. F. O'SHAUGHNESSY.
ELECTRIC RAILWAY.
No. 468,959. Patented Feb. 16, 1892.

WITNESSES:

INVENTORS
BY
ATTORNEYS.

(No Model.) 5 Sheets—Sheet 4.

F. J. SPRAGUE & P. F. O'SHAUGHNESSY.
ELECTRIC RAILWAY.

No. 468,959. Patented Feb. 16, 1892.

WITNESSES:

INVENTORS

BY

ATTORNEYS.

(No Model.) 5 Sheets—Sheet 5.

F. J. SPRAGUE & P. F. O'SHAUGHNESSY.
ELECTRIC RAILWAY.

No. 468,959. Patented Feb. 16, 1892.

WITNESSES:

INVENTORS
Frank J. Sprague
Patrick F. O'Shaughnessy
BY

ATTORNEYS.

UNITED STATES PATENT OFFICE.

FRANK J. SPRAGUE AND PATRICK F. O'SHAUGHNESSY, OF NEW YORK, N. Y., ASSIGNORS TO THE SPRAGUE ELECTRIC RAILWAY AND MOTOR COMPANY, OF SAME PLACE.

ELECTRIC RAILWAY.

SPECIFICATION forming part of Letters Patent No. 468,959, dated February 16, 1892.

Application filed January 19, 1889. Serial No. 296,872. (No model.)

*To all whom it may concern:*

Be it known that we, FRANK J. SPRAGUE and PATRICK F. O'SHAUGHNESSY, both citizens of the United States, residing at the city of New York, in the county and State of New York, have invented a certain new and useful Improvement in Electric Railways, of which the following is a specification.

Our invention relates to switch-plates which are attached to overhead conductors in electric-railway systems at the junctions of branching conductors. Such switch-plates are at present mainly used at turn-outs in single-track roads. They are, however, useful in any case where the overhead conductor branches as to a side track or a branch or cross road.

The main object of our invention is to so construct and arrange the switch-plate that the contact device which makes underneath contact with the overhead conductor and travels over such switch-plate will be readily guided across the switch-plate to its proper outlet, and further objects are to improve the general construction of the switch-plate, the manner of supporting it, and the manner of joining the conductors to it. Turn-outs on electric railways are of two general kinds known as "diamond" turn-outs, in which both tracks diverge from their straight course, and "lateral" turn-outs, in which only one track is curved and the other remains straight. Each of these classes is further divided into "right-hand" and "left-hand" turn-outs, according to the direction in which the car turns in passing upon the turn-out. By our invention we provide switch-plates suitable for all these different forms of switches, and also, as above stated, for other places at which branching conductors are required. We employ on the surface of the switch-plate under which the contact device travels (such contact device being usually a grooved wheel or trolley) a downwardly-extending rib, with which the trolley engages and on which the trolley travels and is guided during its passage in one direction, while on its passage in the other direction the trolley travels on the surface of the plate only. Such rib is preferably movable, so that, while it remains stationary when the trolley travels upon it, it is pushed aside by the trolley traveling on the switch-plate and allows the trolley to reach its outlet. We prefer to employ a spring-rib, and in all the cases above referred to such rib is secured at the wide end of the plate on the side at which the trolley leaves the plate and its free end extends to the middle of the plate at the narrow end thereof. This is the main feature of our invention; but our invention further consists in various novel devices and combination of devices employed by us for carrying into effect the above-named objects, as hereinafter set forth and claimed.

Our invention is illustrated in the accompanying drawings.

Figure 9:
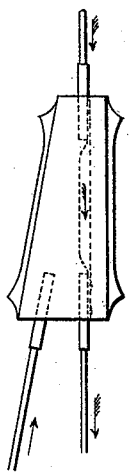
Figure 10:
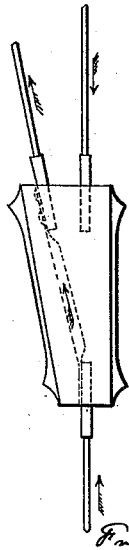
Figure 11:
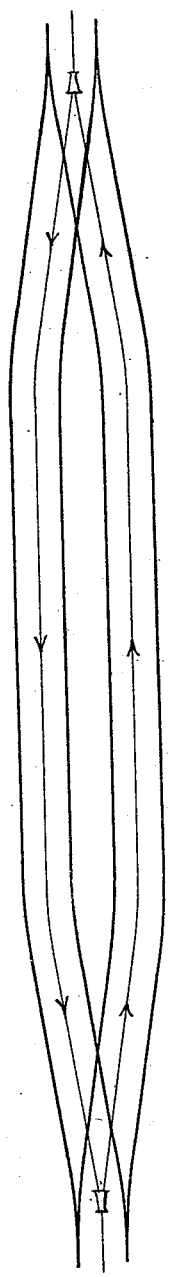
Figure 12:
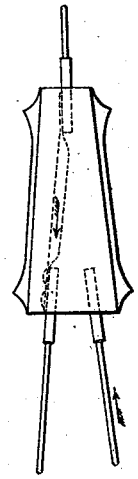
Figure 13:
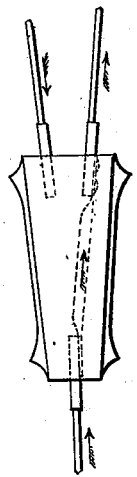
Figure 15:
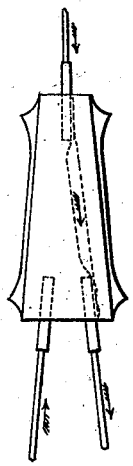
Figure 14:
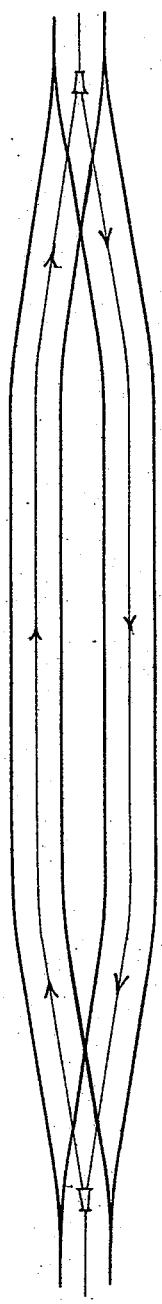
Figure 16:
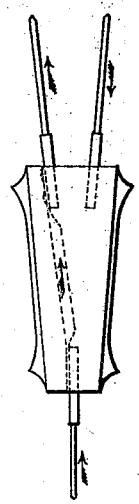

Figure 1 is a bottom view of a switch-plate embodying our invention; Fig. 2, a top view of the same; Fig. 3, a cross-section on the line $x\ x$ of Fig. 2, looking toward the narrow end of the plate; Fig. 4, a side elevation of the plate; Fig. 4$^a$, a front view of the supporting-hanger; Fig. 5, a plan of a right-hand lateral turn-out; Figs. 6 and 7, top views of the switch-plates at the respective ends thereof with the parts beneath the plates in dotted lines. Figs. 8, 9, and 10 are similar views of a left-hand lateral turn-out; Figs. 11, 12, and 13, similar views of a right-hand diamond turn-out, and Figs. 14, 15, and 16 similar views of a left-hand diamond turn-out.

Referring first to Figs. 1 to 4$^a$, A is a flat metal plate having on each side a downwardly-extending rib B, whose ends are bent first inwardly and then outwardly, so as to make flaring gaps for the passage of the trolley. The plate is, as shown, wider at one end than at the other, and at its wide end it receives the two conductors C C' and at its narrow end the single conductor D, the conductor D being the main-line conductor and the conductors C and C' being those which extend along the tracks of the turn-out. E is one of the ordinary suspending-wires which cross the track and from which the switch-plate is suspended by clasps or hooks $a$, which are connected by transverse arms $a'$ with the hood F, from which a stem G extends down to the plate, being hung from said stem on a pin passing between lugs *b*, from which lugs a screw-threaded stem extends down into a projection *c* on the top of the switch-plate at its center. At the narrow end of the switch-plate and midway between its sides there extends downwardly a channeled rib H, and at the wide end of the plate there extend down two such channeled ribs I and I', and all these ribs project out a short distance from the extremities of the plate. The wire D is laid in the groove of the rib H and is bent up along the curved edge of said rib and passes through an elongated aperture *d* in the plate and is secured by a nut *e* upon a stem rising from the plate. Similarly the conductors C and C' are laid in the channels of the ribs I and I' and connected above the plate by other nuts *e*. Attached to the rib I' is the movable rib K. This consists of a spring-metal plate which is attached to the outer side of the rib I', extends across the plate diagonally, and rests normally against the side of the rib H. That portion of the plate which extends between the extremities of the ribs H and I' has its edge rolled or curved over, so as to form a curved or tubular head on which the contact device may travel. It will be seen that when the grooved trolley enters the switch-plate upon the wire D it passes along the said wire until it engages with the rib K, whereby it is guided off of said wire and moves along said rib K until it reaches the wire C', on which it leaves the switch-plate; but a trolley entering on the wire C moves across the plate with its flange traveling directly on the surface of the plate until it strikes the rib K, when it pushes said rib aside and is guided by the side rib B upon the wire D and leaves the plate on said wire. The rib K may also receive a trolley traveling from C' to D, if required. The different uses of the switch-plate are shown in the remaining figures of the drawings.

In Figs. 5, 6, and 7, in which one track L extends in a straight line and the other track M branches off from and returns to the track L, a switch-plate S is placed at one end of the turn-out and a switch-plate S' at the other end. These switch-plates are constructed as already described, and in each case the movable rib K is attached to the outgoing rib at the wide end of the plate and rests against the rib at the narrow end of the plate, so that in passing to the outlet at the wide end the trolley rides upon said rib K; but in going in the other direction the trolley travels on the surface of the plate and pushes aside said rib K and is guided to the conductor D. The arrows show the direction of movement of the trolley.

In Figs. 8, 9, and 10 the turn-out is to the left instead of to the right, and the movable rib is placed on the opposite side of the plate from that in the right-hand switch, it being, however, in this case also attached to the outgoing conductor at the wide end of the plate.

The same is true of the switch-plates for the right-hand and left-hand diamond turn-outs shown in Figs. 11 to 16, and the operation and arrangement of these plates will be readily understood from the foregoing explanation. It will be seen that the switch-plate is hung on a transverse pivot at *b*, and is therefore adapted to be tipped up at either end and placed in an inclined position when this is made necessary by reason of inequalities in the elevation of the conductors, and, furthermore, being swiveled at *c*, the plate may be turned at an angle, so that it may be used on curved portions of the line. The branching arms *a'* prevent any lateral rocking of the plate, whereby the plate might become inclined laterally.

What we claim is—

1. In an electric railway, the combination, with an overhead conductor for receiving an underneath contact, of a switch-plate connected therewith and a guiding-rib on the under side of said switch-plate on which the contact device travels in crossing said switch-plate, substantially as set forth.

2. In an electric railway, the combination of a switch-plate, a conductor for receiving an underneath contact connected with said switch-plate at one end, another conductor connected with said switch-plate at the other end, and a rib on said switch-plate extending from one of said conductors to the other, on the under side of which the contact device travels in crossing the switch-plate, substantially as set forth.

3. In an electric railway, the combination, with an overhead line for receiving an underneath contact, of a switch-plate supported above said line and a downwardly-extending rib on the under side of such switch-plate on which the contact device travels in crossing said plate, substantially as set forth.

4. In an overhead line for electric railways, the combination of a switch-plate, conductors for receiving an underneath contact, extending beneath said switch-plate at its extremities and connected with said plate, and a downwardly-extending rib extending from one of said conductors to the other, on the under side of which the contact device travels in crossing the switch-plate, substantially as set forth.

5. In an electric railway, the combination of a switch-plate, two conductors connected with said switch-plate at one end, and one conductor connected with said plate at the other end, said conductors being arranged to receive an underneath contact, and a rib on said switch-plate, extending from said single conductor to one of the two conductors at the other end of the plate, on the under side of which the contact device travels in crossing said switch-plate, substantially as set forth.

6. In an electric railway, the combination of a switch-plate, conductors connected with said switch-plate at one end, a conductor connected with said switch-plate at the other end, said conductors being arranged to receive an underneath contact, and a movable rib on said plate extending from the latter conductor to one of the conductors at the other end of the plate, on the under side of which the contact device travels in crossing said switch-plate, substantially as set forth.

7. In an electric railway, the combination of a switch-plate, two conductors connected with said switch-plate at one end, a single conductor connected with said plate at its other end, said conductors being arranged to receive an underneath contact, and a movable rib attached to one of said two conductors and having its free end normally in contact with said single conductor, on the under side of which rib the contact device travels in crossing the switch-plate, substantially as set forth.

8. In an overhead line for electric railways, the combination of a switch-plate supported above the line, two conductors extending beneath said switch-plate at one end thereof and attached to said plate, a single conductor extending beneath the other end of the plate and attached thereto, said conductors being arranged to receive an underneath contact, and a movable rib extending from said single conductor to one of said two conductors at the other end, on the under side of which rib the contact device travels in crossing the switch-plate, substantially as set forth.

9. In an overhead line for electric railways, the combination of a switch-plate, two conductors extending beneath said switch-plate at one end and attached to said plate, a single conductor entering said plate at the other end and attached thereto, and a movable rib attached to the outgoing one of said two conductors and extending to said single conductor, substantially as set forth.

10. In an electric railway, the combination of a turn-out overhead conductor following the tracks of the turn-out, and a switch-plate at each end of said turn-out connected with the conductors, each of said plates having a movable rib extending from the outgoing one of the pair of conductors at one end to the single conductor at the other end of the plate, substantially as set forth.

11. In an electric railway, the combination of a switch-plate having downwardly-extending channeled ribs at its extremities and conductors laid in the channels of said ribs and attached to said plate, substantially as set forth.

12. In an electric railway, the combination, with overhead conductors, of a switch-plate having downwardly-extending ribs at its extremities in line with said conductors, said conductors being placed in contact with said ribs and attached to said plate, substantially as set forth.

13. In an electric railway, the combination, with overhead conductors, of a switch-plate having a guiding-rib on its surface, consisting of a flat web and a rounded head, substantially as set forth.

14. In an electric railway, the combination, with overhead conductors, of a switch-plate having a guiding-rib on its surface, consisting of a flat plate with its edge rolled or bent to form a curved head, substantially as set forth.

15. In an electric railway, the combination, with overhead conductors, of a switch-plate attached thereto and in electrical connection therewith, a cross-wire supporting said switch-plate, and an insulating-hanger connecting said switch-plate with said wire, substantially as set forth.

16. In an electric railway, the combination, with overhead conductors, of a switch-plate attached thereto and a swiveling support for said switch-plate, substantially as set forth.

17. In an electric railway, the combination, with overhead conductors, of a switch-plate attached thereto and a pivoting-support for said switch-plate, substantially as set forth.

18. In an electric railway, the combination, with overhead conductors, of a switch-plate attached thereto and a support for said switch-plate, permitting the inclination and the lateral deflection thereof, substantially as set forth.

19. In an electric railway, the combination, with overhead conductors, of a switch-plate attached thereto and a hanger for said switch-plate, having laterally-extending arms, whereby the lateral inclination of the plate is prevented, substantially as set forth.

20. In an electric railway, the combination, with overhead conductors, of a switch-plate having apertures through which the conductors pass, substantially as set forth.

21. In an electric railway, the combination, with an overhead conductor, of a switch-plate connected therewith, said switch-plate having a surface rib on which the contact device travels, and side ribs, substantially as set forth.

22. In an electric railway, the combination, with an overhead line, of a switch-plate supported above said line, said plate having a downwardly-extending rib on which the contact device travels, and side ribs, substantially as set forth.

23. In an electric railway, the combination of a switch-plate, conductors connected with said switch-plate at one end, and a conductor connected with said switch-plate at the other end, said plate having side ribs and a movable rib extending from the latter conductor to one of the conductors at the other end of the plate, substantially as set forth.

This specification signed and witnessed this 14th day of January, 1889.

FRANK J. SPRAGUE.
PATRICK F. O'SHAUGHNESSY.

Witnesses:
E. VAUGHAN,
I. E. MOULTROP.